US008275159B2

(12) United States Patent
Lee

(10) Patent No.: US 8,275,159 B2
(45) Date of Patent: Sep. 25, 2012

(54) MEDIA PLAYBACK APPARATUS HAVING SPEAKERS WITH ROTATABLE CONNECTING MEANS

(75) Inventor: Duck Soo Lee, Seoul (KR)

(73) Assignee: Neofidelity, Inc., Seoul (KR)

( * ) Notice: Subject to any disclaimer, the term of this patent is extended or adjusted under 35 U.S.C. 154(b) by 1219 days.

(21) Appl. No.: 12/076,892

(22) Filed: Mar. 25, 2008

(65) Prior Publication Data

US 2008/0240487 A1 Oct. 2, 2008

(30) Foreign Application Priority Data

Mar. 26, 2007 (KR) ........................ 10-2007-0029319

(51) Int. Cl.
*H04R 5/02* (2006.01)
*H04R 1/02* (2006.01)
*H04R 9/06* (2006.01)
*H04B 1/00* (2006.01)

(52) U.S. Cl. .............. 381/300; 381/86; 381/87; 381/89; 381/301; 381/302; 381/303; 381/304; 381/305; 381/306; 381/307; 381/308; 381/309; 381/310; 381/311; 381/332; 381/333; 381/334; 381/335; 381/336; 381/388

(58) Field of Classification Search .............. 381/86–89, 381/300–311, 332–336, 388
See application file for complete search history.

(56) References Cited

U.S. PATENT DOCUMENTS 3,180,447 A * 4/1965 Huff et al. .................... 181/145
3,489,472 A * 1/1970 Kaminski et al. ............ 312/8.14
4,974,759 A * 12/1990 McDonough ................ 224/443
5,266,751 A * 11/1993 Taguchi ........................ 181/144
5,349,575 A * 9/1994 Park ................................ 369/1
5,758,852 A * 6/1998 Martin ........................ 248/282.1
5,852,545 A * 12/1998 Pan-Ratzlaff ............ 361/679.23
6,040,978 A * 3/2000 Spencer .................... 361/679.27
6,151,401 A * 11/2000 Annaratone .................. 381/388
6,466,436 B2 * 10/2002 Faranda et al. .......... 361/679.33
6,721,434 B2 * 4/2004 Polk et al. ...................... 381/388
6,744,898 B1 * 6/2004 Hirano .......................... 381/333
6,968,068 B1 * 11/2005 Amsel .......................... 381/334
7,043,044 B2 * 5/2006 Amid-Hozour ............... 381/388
7,095,867 B2 * 8/2006 Schul et al. ................... 381/334
D530,310 S * 10/2006 Tsai ............................ D14/215
D535,288 S * 1/2007 Files ............................ D14/215
7,201,251 B1 * 4/2007 Baird ............................ 181/145
7,230,822 B2 * 6/2007 Langberg et al. ........ 361/679.23
D552,593 S * 10/2007 Ahlgrim et al. .............. D14/168
7,425,080 B2 * 9/2008 Lin ................................ 362/86
7,454,022 B2 * 11/2008 Neumann et al. ............... 381/59
7,782,012 B2 * 8/2010 Jo ................................ 320/115
8,180,095 B2 * 5/2012 Zhang ........................... 381/387
(Continued)

FOREIGN PATENT DOCUMENTS

JP 2001078291 A * 3/2001
JP 2007318301 A * 12/2007
KR 1998-025728 7/1998

*Primary Examiner* — Ida M Soward
(74) *Attorney, Agent, or Firm* — Stein McEwen, LLP

(57) ABSTRACT

A media playback media playback apparatus having user-selectable shapes is disclosed. In accordance with the media playback apparatus having user-selectable shapes in accordance with the present invention, speakers are attached to a media playback unit via rotatable connecting means such that a user may select a shape of the media playback apparatus according to his or her preference.

15 Claims, 7 Drawing Sheets

U.S. PATENT DOCUMENTS

| | | | | |
|---|---|---|---|---|
| 2002/0146140 | A1 * | 10/2002 | Chiu | 381/332 |
| 2002/0172393 | A1 * | 11/2002 | Bank et al. | 381/431 |
| 2004/0135476 | A1 * | 7/2004 | Gillengerten | 312/8.16 |
| 2005/0025326 | A1 * | 2/2005 | Hussaini et al. | 381/333 |
| 2006/0078143 | A1 * | 4/2006 | Yang | 381/333 |
| 2008/0035815 | A1 * | 2/2008 | Yim et al. | 248/242 |
| 2008/0089547 | A1 * | 4/2008 | Young et al. | 381/386 |

* cited by examiner

MEDIA PLAYBACK APPARATUS HAVING SPEAKERS WITH ROTATABLE CONNECTING MEANS

BACKGROUND OF THE INVENTION

1. Field of the Invention

The present invention relates to a media playback apparatus having user-selectable shapes, and in particular, to a media playback apparatus having user-selectable shapes wherein speakers are attached to a media playback unit via a rotatable connecting means such that a user may select a shape of the media playback apparatus according to his or her preference.

2. Description of the Related Art

A media playback apparatus is a multimedia equipment providing various functions capable of receiving a radio broadcast and carrying out a voice recording as well as reproducing a digital audio file such as an MP3 file and a digital video file.

Generally, the media playback apparatus comprises speakers as well as a media playback unit for reproducing the media files. The media playback unit is connected to the speakers via a cable wherein a shape or an arrangement of the media playback apparatus is fixed. Therefore, the user cannot change the shape or the arrangement of the media playback apparatus. Moreover, the media playback apparatus cannot have the shape to match its surroundings.

SUMMARY OF THE INVENTION

It is an object of the present invention to provide a media playback apparatus having user-selectable shapes wherein speakers are attached to a media playback unit via a rotatable connecting means such that a user may select a shape of the media playback apparatus according to his or her preference.

In order to achieve the above-described object, there is provided a media playback apparatus comprising: a media playback unit for reproducing a media file; and a first speaker and a second speaker attached to the media playback unit via a first hinge and a second hinge, respectively, the first speaker and the second speaker converting an output signal of the media playback unit to an audible signal, the first speaker comprising a FL speaker and an RL speaker, the second speaker comprising a FR speaker and an RR speaker, wherein the media playback unit comprises: a detachable media player; and a connector for providing an electrical connection between the detachable media player and the first speaker and the second speaker.

Preferably, the first speaker and the second speaker further comprise a fourth hinge disposed between the FL speaker and the RL speaker and a fifth hinge disposed between the FR speaker and the RR speaker, respectively, and wherein the first hinge is disposed between one of the FL speaker and the RL speaker and the media playback unit, and the second hinge is disposed between one of the FR speaker and the RR speaker and the media playback unit.

Preferably, the first hinge is disposed at a lower portion of a boundary between one of the FL speaker and the RL speaker and the media playback unit, and the second hinge is disposed at a lower portion of a boundary between one of the FR speaker and the RR speaker and the media playback unit when the fourth hinge and the fifth hinge are disposed at an upper portion of the FL speaker and the RL speaker and an upper portion of the FR speaker and the RR speaker, respectively, and wherein the first hinge is disposed at an upper portion of the boundary between one of the FL speaker and the RL speaker and the media playback unit, and the second hinge is disposed at an upper portion of the boundary between one of the FR speaker and the RR speaker and the media playback unit when the fourth hinge and the fifth hinge are disposed at a lower portion of the FL speaker and the RL speaker and an lower portion of the FR speaker and the RR speaker, respectively.

Preferably, the media playback apparatus in accordance with the present invention further comprises an auxiliary block attached to a backside of the media playback unit via a third rotatable connecting means.

Preferably, the auxiliary block comprises one of a power supply and a third speaker.

Preferably, the first speaker and the second speaker further comprise a fourth hinge disposed between the FL speaker and the RL speaker and a fifth hinge disposed between the FR speaker and the RR speaker, respectively, and wherein the first hinge is disposed between one of the media playback unit and the FL speaker; and the auxiliary block and the RL speaker, and the second hinge is disposed between one of the media playback unit and the FR speaker; and the auxiliary block and the RR speaker.

Preferably, the first hinge is disposed at one of a lower portion of a boundary between the FL speaker and the media playback unit; and a lower portion of a boundary between the RL speaker and the auxiliary block, and the second hinge is disposed at one of a lower portion of a boundary between the FR speaker and the media playback unit; and a lower portion of a boundary between the RR speaker and the auxiliary block when the fourth hinge and the fifth hinge are disposed at an upper portion of the FL speaker and the RL speaker; and an upper portion of the FR speaker and the RR speaker, respectively, and wherein the first hinge is disposed at one of an upper portion of the boundary between the FL speaker and the media playback unit; and an upper portion of the boundary between the RL speaker and the auxiliary block, and the second hinge is disposed at one of an upper portion of the boundary between the FR speaker and the media playback unit; and an upper portion of the boundary between the RR speaker and the auxiliary block when the fourth hinge and the fifth hinge are disposed at a lower portion of the FL speaker and the RL speaker; and a lower portion of the FR speaker and the RR speaker, respectively.

Preferably, the media playback apparatus in accordance with the present invention further comprises a fixing means disposed at an interface between the media playback unit and the first speaker and the second speaker.

Preferably, the fixing means comprises one of a magnet and a snap-on button.

Preferably, the media playback apparatus in accordance with the present invention further comprises a flexible connecting means for electrically connecting the media playback unit, and the first speaker and the second speaker.

Preferably, the flexible connecting means comprises one of a flexible PCB and a flexible flat cable.

Preferably, the first speaker and the second speaker are disposed in a manner that the audible signal is emitted in an outward direction.

Preferably, the media playback unit further comprises a case for accommodating the detachable media player.

Preferably, the media playback unit comprises a communication interface for carrying out a data communication with an external storage means, the media playback unit reading through the communication interface and reproducing the media file stored in the external storage means.

Preferably, the media playback apparatus in accordance with the present invention further comprises a speaker controller for controlling an operation of the FL speaker and the RL speaker, and the FR speaker and the RR speaker.

DETAILED DESCRIPTION OF THE INVENTION

The above-described objects and other objects and characteristics and advantages of the present invention will now be described in detail with reference to the accompanied drawings.

Figure 1A:
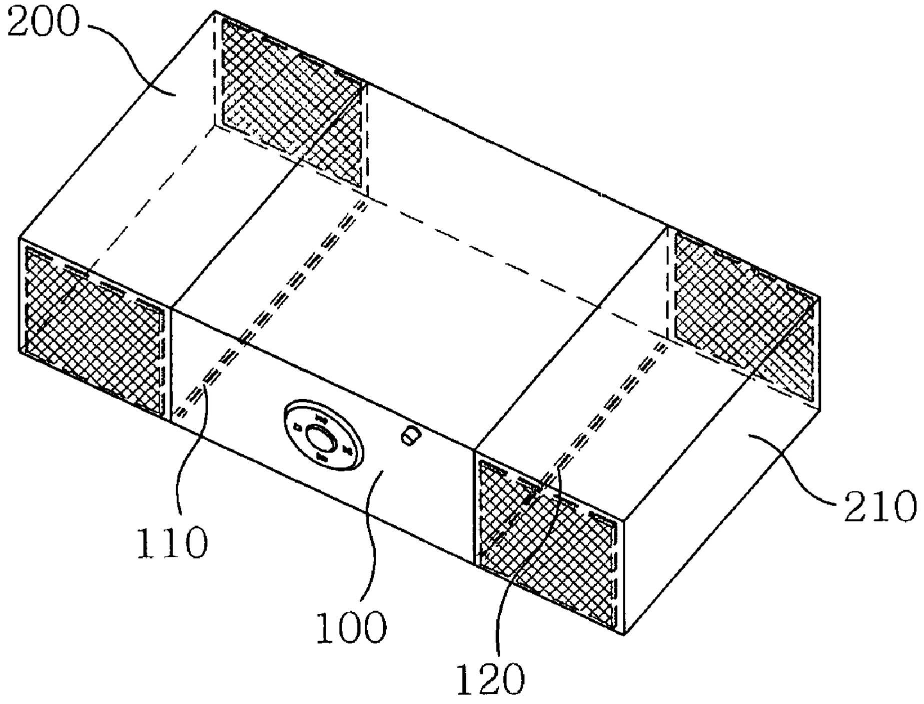
FIGS. 1A through 1C are perspective views illustrating a media playback apparatus having user-selectable shapes in accordance with a first embodiment of the present invention.
Figure 1B:
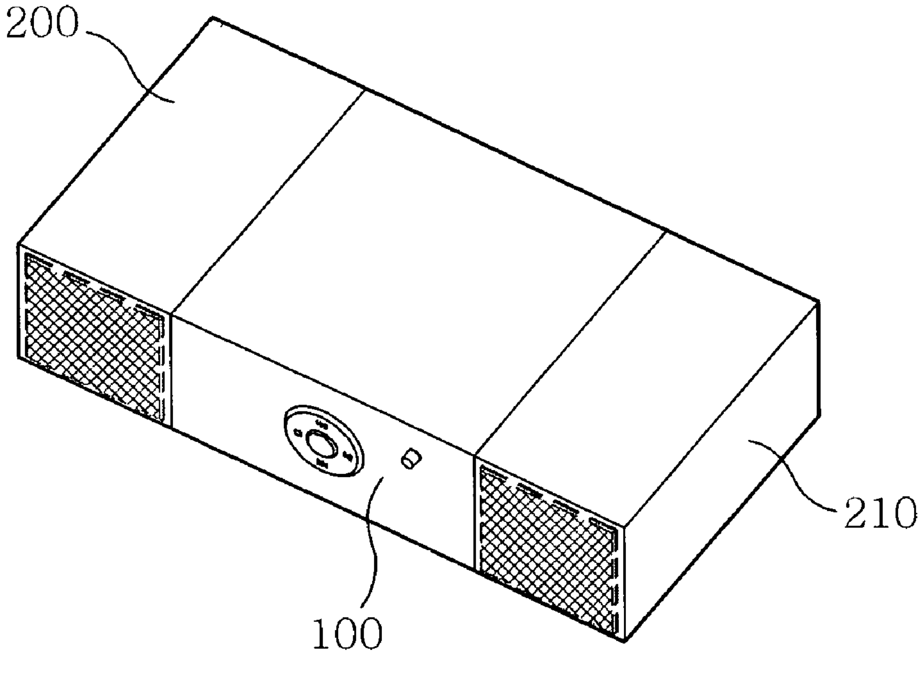
Figure 1C:
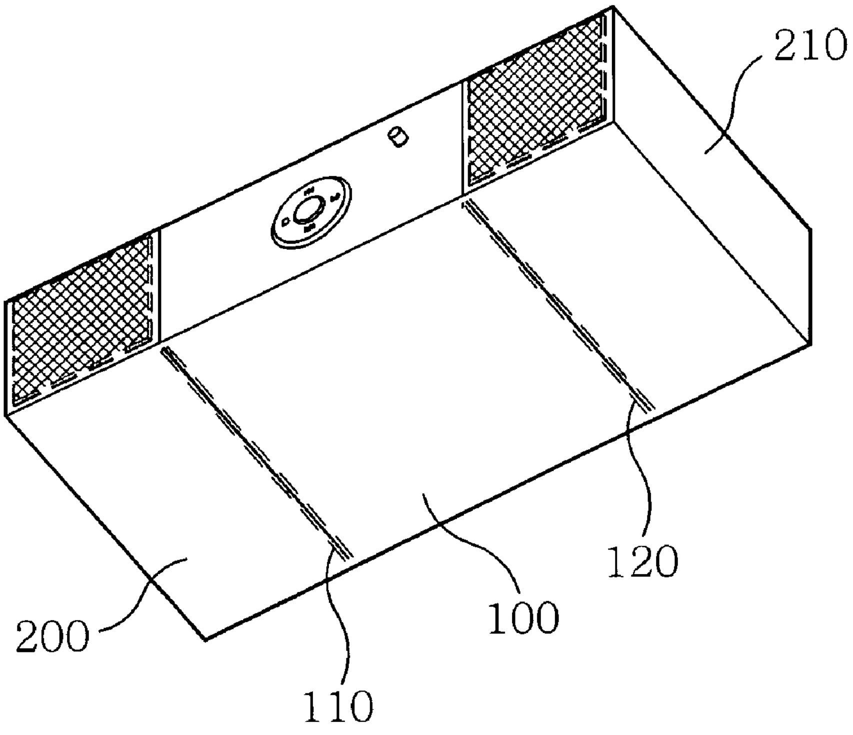
Figure 2:
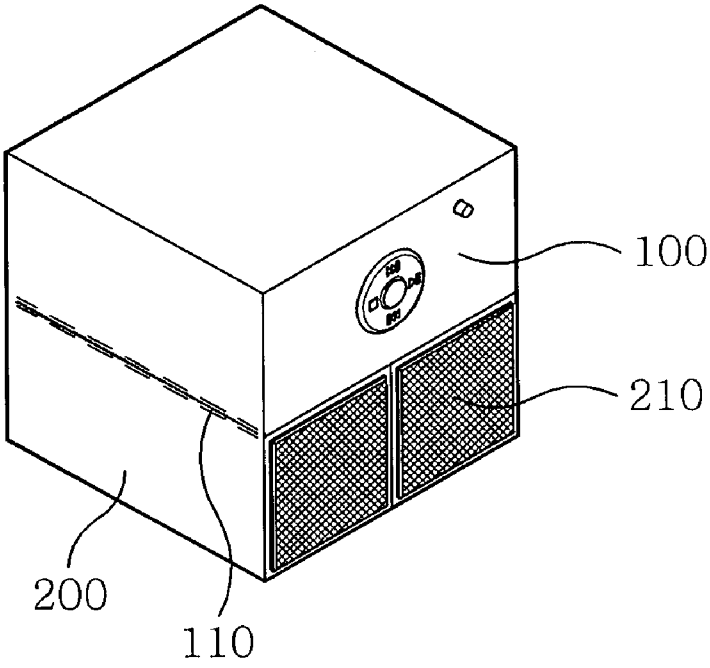
FIG. 2 is a perspective view illustrating an arrangement of a media playback apparatus having user-selectable shapes in accordance with a first embodiment of the present invention.

FIGS. 1A through 1C are perspective views illustrating a media playback apparatus having user-selectable shapes in accordance with a first embodiment of the present invention.

Referring to FIGS. 1A through 1C, the media playback apparatus having the user-selectable shapes in accordance with the first embodiment of the present invention comprises a media playback unit 100, a first speaker 200 and a second speaker 210.

The media playback unit 100 decodes and converts a digital medial file stored therein or received from an external storage into an analog signal. The analog signal is amplified and outputted to the first speaker 200 and the second speaker 210. A method for reproducing the digital media file by the media playback unit 100 is similar to a conventional media player. Therefore, a detailed description thereof is omitted.

The first speaker 200 and the second speaker 210 convert the amplified analog signal to an audible signal in an audible frequency band.

The media playback unit 100 may be electrically connected to the first speaker 200 and the second speaker 210 via a flexible connecting means such as a flexible PCB (FPCB) and a flexible flat cable (FFC).

The first speaker 200 is attached to the media playback unit 100 via a first rotatable connecting means 110, and the second speaker 210 is attached to the media playback unit 100 via a second rotatable connecting means 120. It is preferable that the rotatable connecting means comprises a hinge.

In addition, it is preferable that the first speaker 200 and the second speaker 210 is disposed in a manner that the audible signal is emitted in an outward direction. That is, the first speaker 200 and the second speaker 210 face a forward direction and a reverse direction of the media playback apparatus in accordance with the present invention.

As shown in FIGS. 1A through 1C, the first rotatable connecting means 110 may be disposed at a lower portion of a boundary between the media playback unit 100 and the first speaker 200, and the second rotatable connecting means 120 may be disposed at a lower portion of a boundary between the media playback unit 100 and the second speaker 210 in accordance with the first embodiment of the present invention.

As a result, the first speaker 200 and the second speaker 210 may be disposed under the media playback unit 100.

The media playback apparatus in accordance with the first embodiment of the present invention may have different arrangements according to a position and a size of the rotatable connecting means attaching the first speaker 200 and the second speaker 210 to the media playback unit 100.

Although not shown, when the first rotatable connecting means 110 is disposed at an upper portion of the boundary between the media playback unit 100 and the first speaker 200 for instance, the second rotatable connecting means 120 may be disposed at an upper portion of the boundary between the media playback unit 100 and the second speaker 210.

In such case, a fixing means (not shown) such as a magnet and a snap-on button may be disposed at an interface between the media playback unit 100 and the first speaker 200 and the second speaker 210 in order to prevent the first speaker 200 and the second speaker 210 from moving arbitrarily.

Figure 3A:
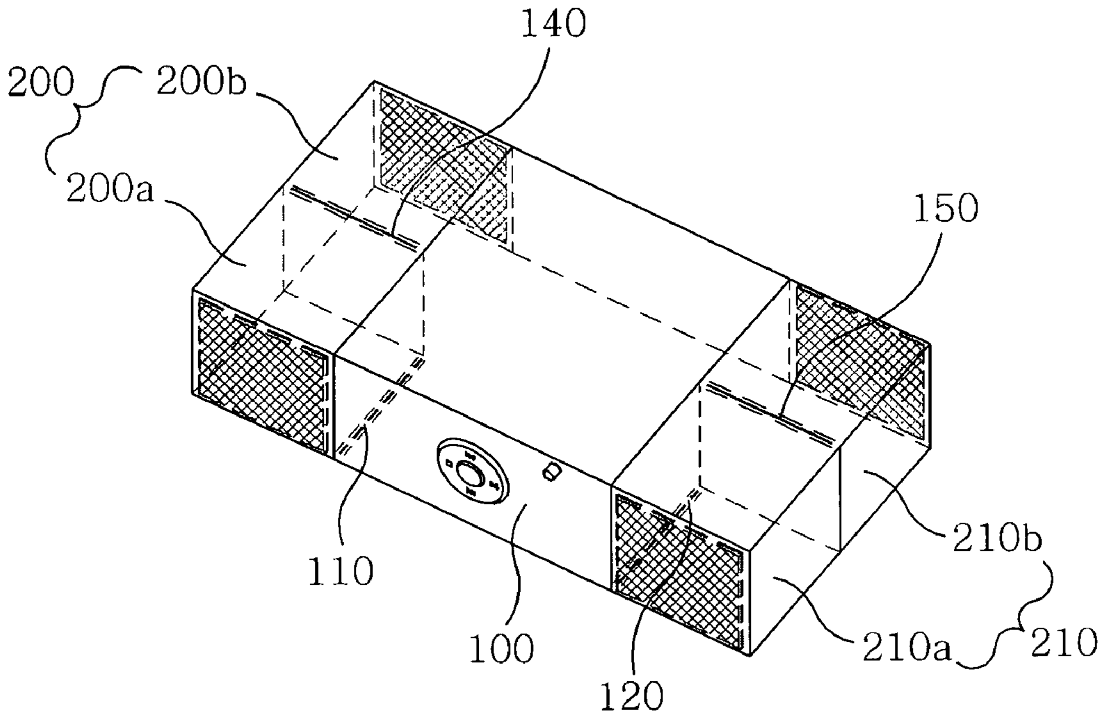
FIGS. 3A through 3C are perspective views illustrating a media playback apparatus having user-selectable shapes in accordance with a second embodiment of the present invention.
Figure 3B:
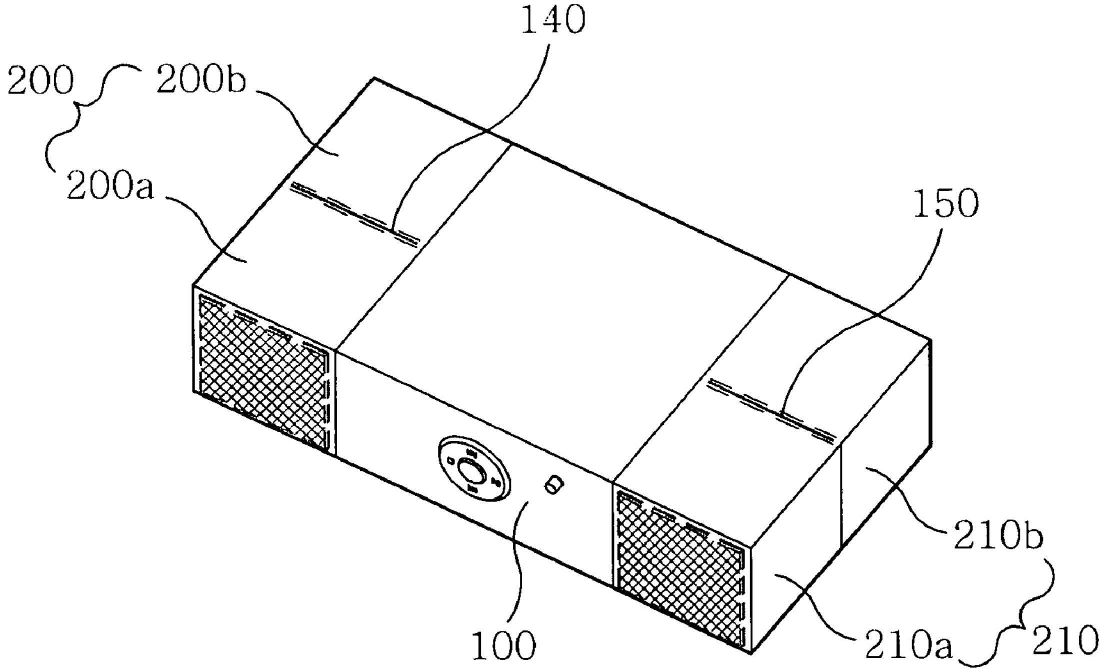
Figure 3C:
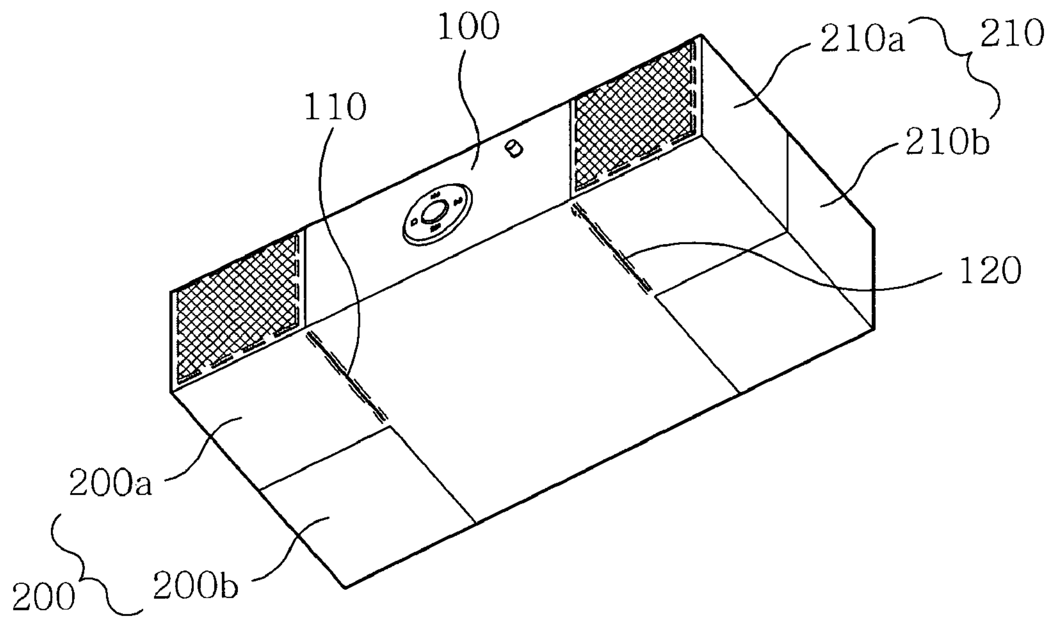

FIGS. 3A through 3C are perspective views illustrating a media playback apparatus having user-selectable shapes in accordance with a second embodiment of the present invention.

Referring to FIGS. 3A through 3C, the media playback apparatus having the user-selectable shapes in accordance with the second embodiment of the present invention comprises a media playback unit 100, a first speaker 200 and a second speaker 210.

Since the media playback unit 100 is identical to that of the media playback apparatus in accordance with the first embodiment of the present invention, a detailed description thereof is hereby omitted.

The first speaker 200 comprises a FL (Front Left) speaker 200*a* and an RL (Rear Left) speaker 200*b*. The FL speaker 200*a* and the RL speaker 200*b* may be attached to each other by a fourth rotatable connecting means 140.

The second speaker 210 comprises a FR (Front Right) speaker 210*a* and an RR (Rear Right) speaker 210*b*. The FR speaker 210*a* and the RR speaker 210*b* may be attached to each other by a fifth rotatable connecting means 150.

As shown in FIGS. 3A through 3C, the first rotatable connecting means 110 may be disposed at a lower portion of a boundary between the media playback unit 100 and the FL speaker 200*a*, and the second rotatable connecting means 120 may be disposed at a lower portion of a boundary between the media playback unit 100 and the FR speaker 210*a* in accordance with the second embodiment of the present invention. In addition, the fourth rotatable connecting means 140 may be disposed at an upper portion of a boundary between the FL speaker 200*a* and the RL speaker 200*b*, and the fifth rotatable connecting means 150 may be disposed at an upper portion of a boundary between the FR speaker 210*a* and the RR speaker 210*b*.

Figure 4:
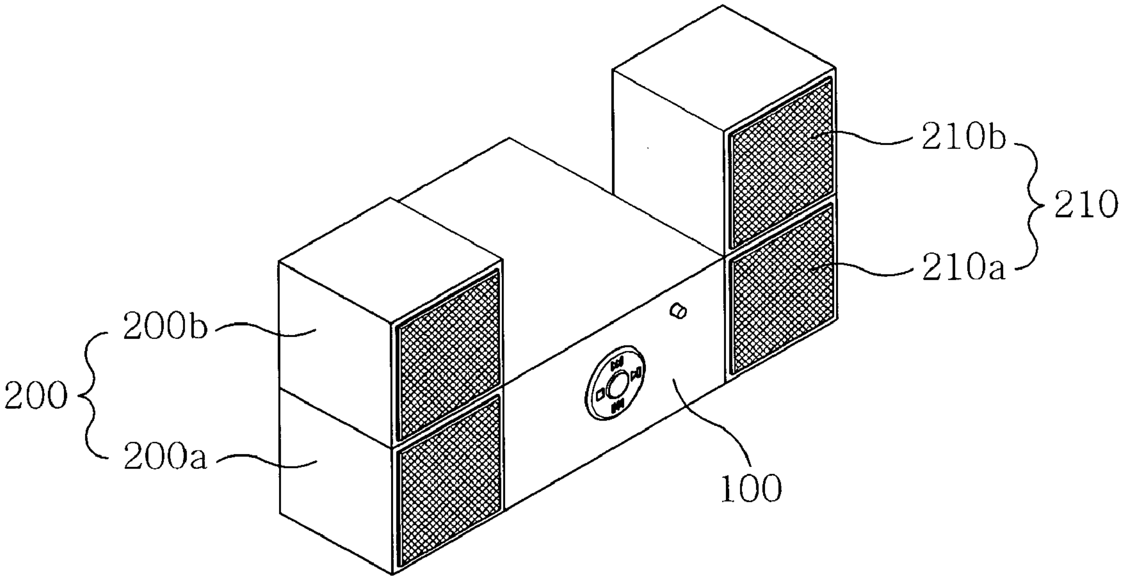
FIGS. 4 through 6 are perspective views illustrating various arrangements of a media playback apparatus having user-selectable shapes in accordance with a second embodiment of the present invention.
Figure 5:
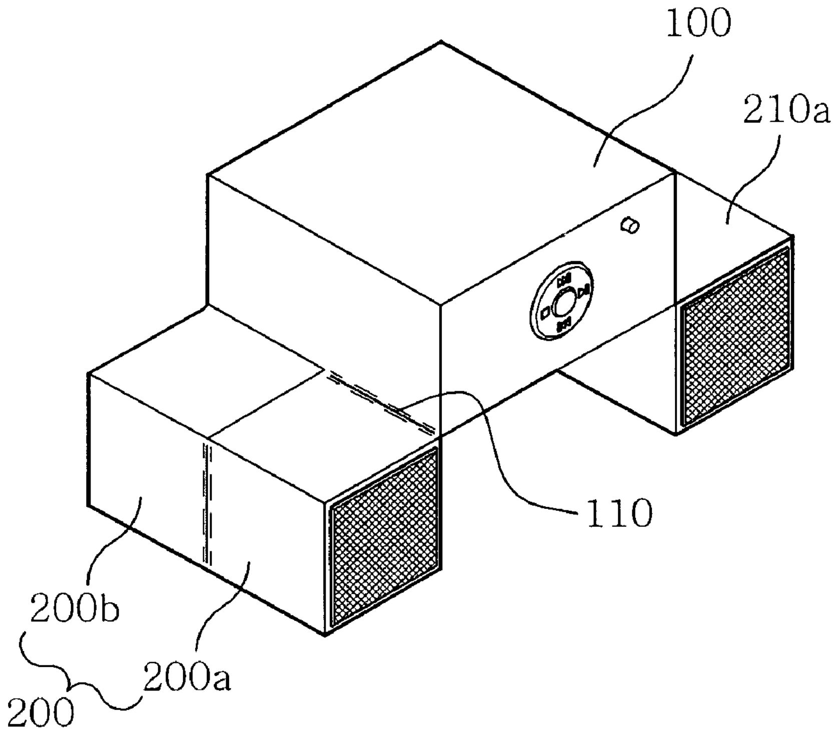
Figure 6:
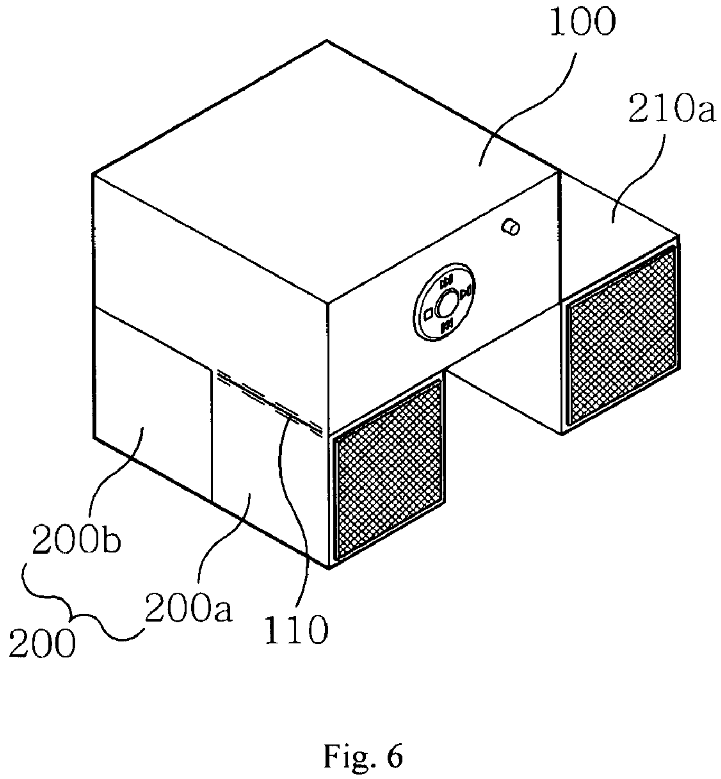

In such case, the RL speaker 200*b* and the RR speaker 210*b* may be arranged to face the forward direction as shown in FIG. 4, and the first speaker 200 and the second speaker 210 may be arranged to be disposed each lower side of the media playback unit 100 as shown in FIG. 5. In addition, the first speaker 200 may be arranged to be disposed under the media playback unit 100 and the second speaker 210 may be arranged to be disposed at a lower right side of the media playback unit 100 as shown in FIG. 6.

A fixing means (not shown) such as a magnet and a snap-on button may be disposed at an interface between the media playback unit 100 and the speakers in order to prevent the speakers from moving arbitrarily similar to the first embodiment.

The media playback apparatus in accordance with the second embodiment of the present invention may have different arrangements according to a position and a size of the rotatable connecting means attaching the FL speaker 200*a* to the RL speaker 200*b* and the FR speaker 210*a* to the RR speaker 210*b*.

Although not shown, when the first rotatable connecting means 110 may be disposed at an upper portion of the boundary between the media playback unit 100 and the FL speaker 200*a* for instance, the second rotatable connecting means 120 may be disposed at an upper portion of the boundary between the media playback unit 100 and the FR speaker 210*a*, the fourth rotatable connecting means 140 may be disposed at a lower portion of the boundary between the FL speaker 200*a* and the RL speaker 200*b*, and the fifth rotatable connecting means 150 may be disposed at a lower portion of the boundary between the FR speaker 210*a* and the RR speaker 210*b*.

Moreover, various arrangements of the media playback apparatus in accordance with the second embodiment of the present invention are possible according to positions of the first rotatable connecting means 110 disposed between the media playback unit 100 and the FL speaker 200*a*, the second rotatable connecting means 120 disposed between the media playback unit 100 the FR speaker 210*a*, the fourth rotatable connecting means 140 disposed between the FL speaker 200*a* and the RL speaker 200*b*, and the fifth rotatable connecting means 150 disposed between the FR speaker 210*a* and the RR speaker 210*b*.

Figure 7A:
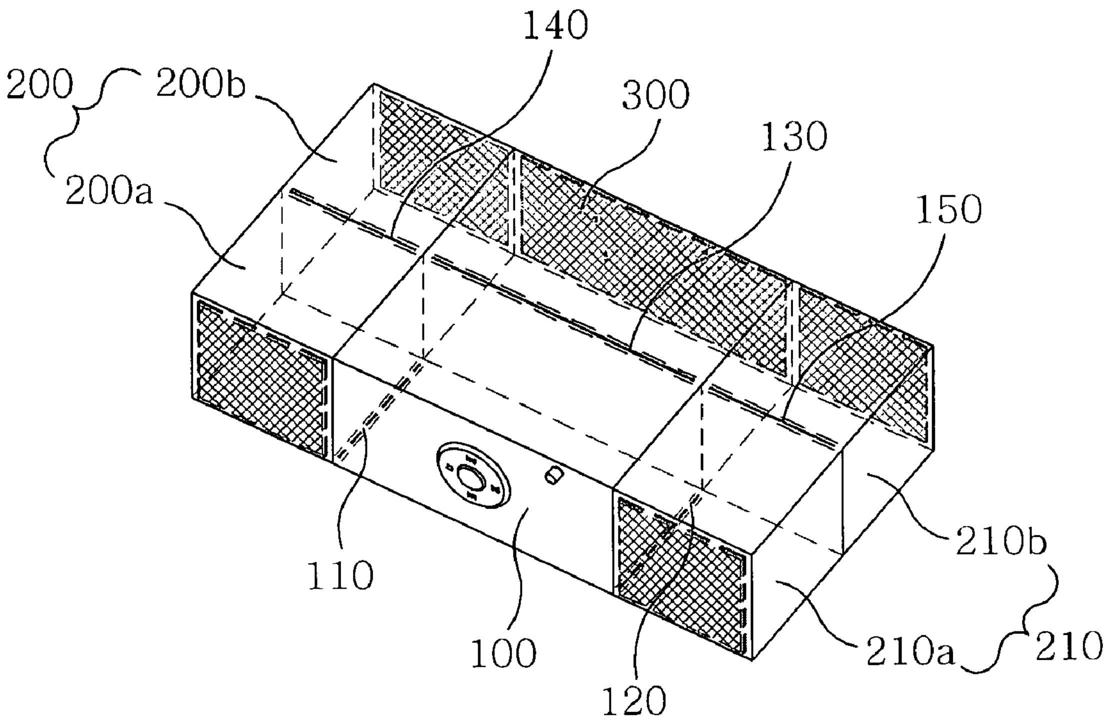
FIGS. 7A through 7C are perspective views illustrating a media playback apparatus having user-selectable shapes in accordance with a third embodiment of the present invention.
Figure 7B:
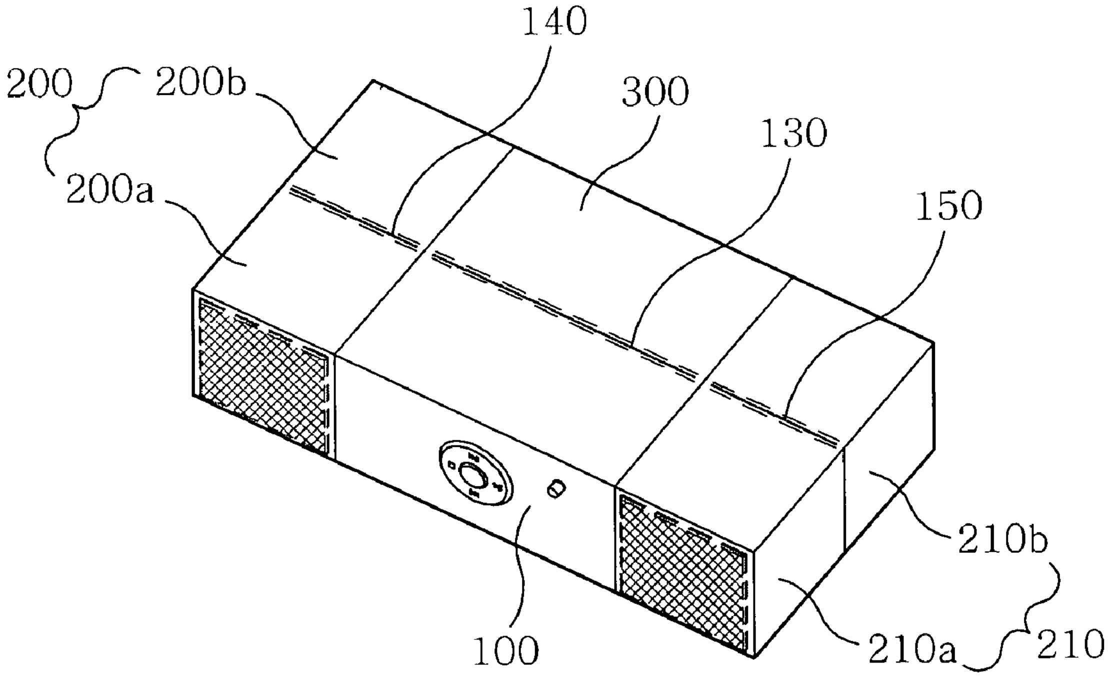
Figure 7C:
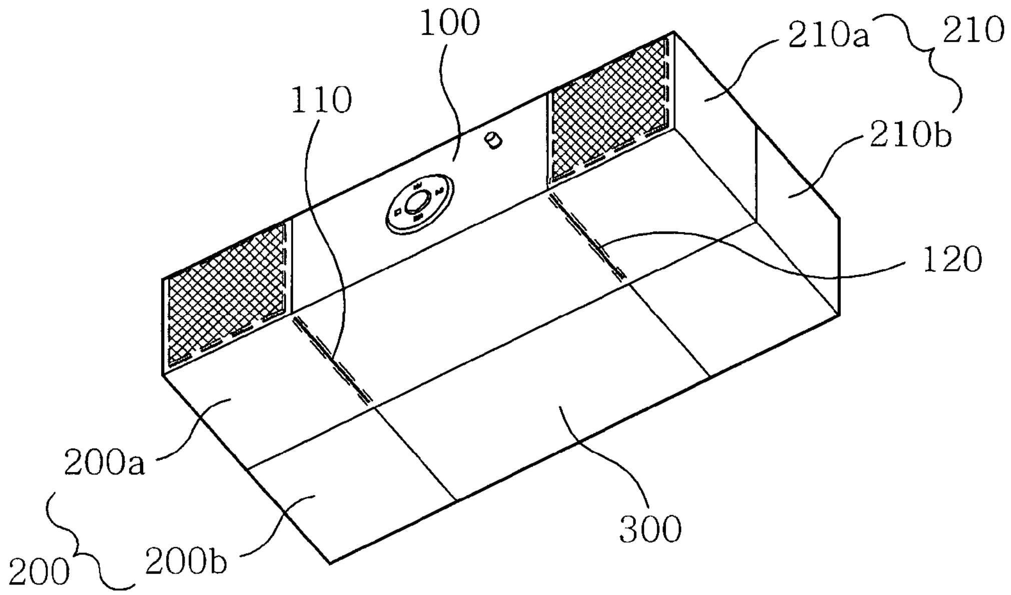

FIGS. 7A through 7C are perspective views illustrating a media playback apparatus having user-selectable shapes in accordance with a third embodiment of the present invention.

Referring to FIGS. 7A through 7C, the media playback apparatus having the user-selectable shapes in accordance with the third embodiment of the present invention comprises a media playback unit 100, a first speaker 200 and a second speaker 210. In addition, the media playback apparatus in accordance with the third embodiment of the present invention may further comprise an auxiliary block 300 attached to a backside of the media playback unit 100.

Since the media playback unit 100, the first speaker 200 and the second speaker 210 are identical to those of the media playback apparatus in accordance with the second embodiment of the present invention, a detailed description thereof is hereby omitted.

The auxiliary block 300 is attached to the back side of the media playback unit 100 via a third rotatable connecting means 130.

The auxiliary block 300 may include one of a power supply for providing a power to the media playback apparatus and a third speaker for converting the amplified analog signal of the media playback unit 100 to the audible signal in the audible frequency band. The third speaker may be a subwoofer speaker.

FIGS. 7A through 7C illustrate an example wherein the auxiliary block 300 includes the third speaker and the positions of the first rotatable connecting means 110, the second rotatable connecting means 120, the fourth rotatable connecting means 140 and the fifth rotatable connecting means 150 are identical to those of the second embodiment. In addition, the third rotatable connecting means 130 may be disposed between the media playback unit 100 and the auxiliary block 300.

Figure 8:
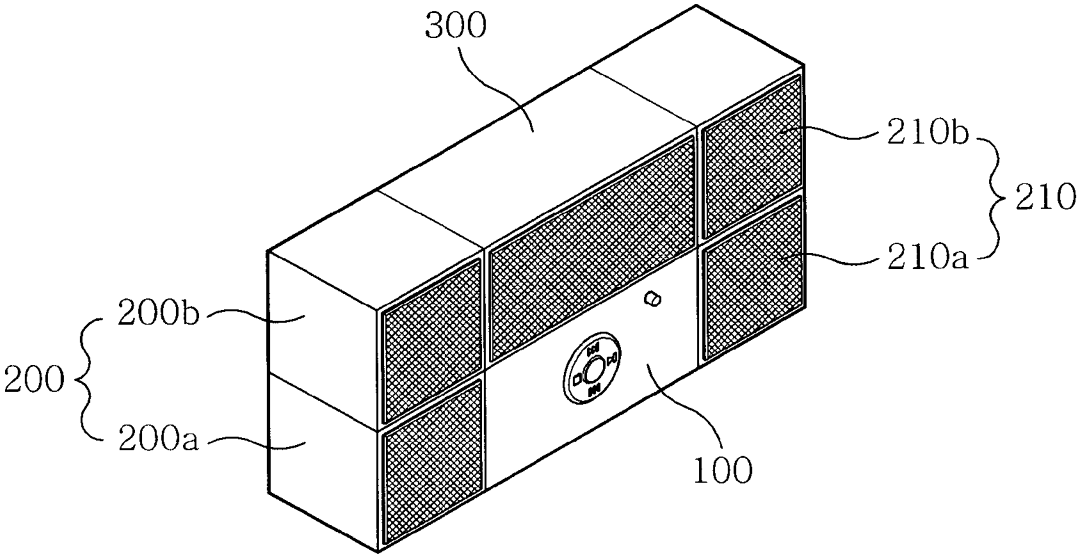
FIG. 8 is a perspective view illustrating an arrangement of a media playback apparatus having user-selectable shapes in accordance with a third embodiment of the present invention.

In such case, the RL speaker 200*b* and the RR speaker 210*b* and the auxiliary block 300 may be arranged to be disposed on the media playback unit 100 as shown in FIG. 8.

A fixing means (not shown) such as a magnet and a snap-on button may be disposed at an interface between the media playback unit 100 and the speakers in order to prevent the speakers from moving arbitrarily similar to the first and the second embodiments.

Since the third rotatable connecting means 130 is disposed at a lower portion of the media playback unit 100, the media playback apparatus in accordance with the third embodiment of the present invention may have various arrangements.

On the other hand, the media playback unit 100 may be embodied in various ways.

Specifically, a configuration for reproducing the media file may be fixedly embodied in the media playback unit 100 or the configuration may be embodied to be detachable from the media playback unit 100.

For instance, a media player for reproducing an MP3 file may be used in the media playback unit 100.

In such case, the media playback unit 100 includes a detachable media player (not shown) and a connector (not shown) for providing an electrical connection between the detachable media player and the first speaker 200 and the second speaker 210. The media playback unit 100 may read the digital audio file stored in the detachable media player.

That is, the media playback apparatus in accordance with the present invention may serve as a docking station. Accordingly, the media playback unit 100 may be a case for accommodating the detachable media player. The shape of the case may vary according to the detachable media player.

On the other hand, when multiple users share the media playback apparatus in accordance with the present invention, each of the users may store a playlist in the media playback unit 100 such that each of the users may listen to his or her selection.

In addition, an external storage means such as a USB stick may be connected to the media playback apparatus of the present invention such that the media files stored therein may be reproduced. Accordingly, the media playback apparatus may further comprise a communication interface for carrying out a data communication with the external storage means to reproduce the media file stored in the external storage means. The communication interface may include a USB interface.

As described above, the first speaker 200 may comprise the FL speaker 200*a* and the RL speaker 200*b*, and the second speaker 210 may comprise the FR speaker 210*a* and the RR speaker 210*b*.

However, an output signal of the speaker may be interfered according to the arrangements of the FL speaker 200*a*, the RL speaker 200*b*, the FR speaker 210*a* and the RR speaker 210*b*.

For instance, when the RL speaker 200*b* and the RR speaker 210*b* are arranged as shown in FIG. 3A and the RL speaker 200*b* and the RR speaker 210*b* are positioned very close to a wall, the output signal of the RL speaker 200*b* and the RR speaker 210*b* may be interfered by the wall.

In order to prevent the interference, the media playback apparatus in accordance with the present invention may further comprise a speaker controller (not shown) for controlling an operation of the FL speaker 200*a*, the RL speaker 200*b*, the FR speaker 210*a* and the RR speaker 210*b*.

The speaker controller may independently turn on or turn off the FL speaker 200*a*, the RL speaker 200*b*, the FR speaker 210*a* and the RR speaker 210*b* automatically or manually according to a user configuration based on the arrangements of the media playback apparatus in accordance with the present invention.

While the media playback apparatus in accordance with the present invention has been particularly shown and described with reference to the preferred embodiment thereof, it will be understood by those skilled in the art that various changes in form and details may be effected therein without departing from the spirit and scope of the invention As described above, the media playback apparatus in accordance with the present invention is advantageous in that the user may easily change the arrangement of the media playback apparatus according to his or her preference by attaching the speakers to the media playback unit via the rotatable connecting means.

In addition, the media playback apparatus in accordance with the present invention is advantageous in that the detachable media player may be connected to the media playback apparatus and the media file stored in the external storage means may be reproduced.

Moreover, the operation of the speakers may be independently controlled to prevent the interference.

What is claimed is:

1. A media playback apparatus comprising:

a media playback unit for reproducing a media file; and a first speaker and a second speaker attached to the media playback unit via a first hinge and a second hinge, respectively, the first speaker and the second speaker converting an output signal of the media playback unit to an audible signal, the first speaker comprising an FL speaker and an RL speaker, the second speaker comprising an FR speaker and an RR speaker, wherein the media playback unit comprises:

a detachable media player; and a connector for providing an electrical connection between the detachable media player and the first speaker and the second speaker.

2. The apparatus in accordance with claim 1, wherein the first speaker and the second speaker further comprise a fourth hinge disposed between the FL speaker and the RL speaker and a fifth hinge disposed between the FR speaker and the RR speaker, respectively, and wherein the first hinge is disposed between one of the FL speaker and the RL speaker and the media playback unit, and the second hinge is disposed between one of the FR speaker and the RR speaker and the media playback unit.

3. The apparatus in accordance with claim 2, wherein the first hinge is disposed at a lower portion of a boundary between one of the FL speaker and the RL speaker and the media playback unit, and the second hinge is disposed at a lower portion of a boundary between one of the FR speaker and the RR speaker and the media playback unit when the fourth hinge and the fifth hinge are disposed at an upper portion of the FL speaker and the RL speaker and an upper portion of the FR speaker and the RR speaker, respectively, and wherein the first hinge is disposed at an upper portion of the boundary between one of the FL speaker and the RL speaker and the media playback unit, and the second hinge is disposed at an upper portion of the boundary between one of the FR speaker and the RR speaker and the media playback unit when the fourth hinge and the fifth hinge are disposed at a lower portion of the FL speaker and the RL speaker and a lower portion of the FR speaker and the RR speaker, respectively.

4. The apparatus in accordance with claim 1, further comprising an auxiliary block attached to a backside of the media playback unit via a third rotatable connecting means.

5. The apparatus in accordance with claim 4, wherein the auxiliary block comprises one of a power supply and a third speaker.

6. The apparatus in accordance with claim 5, wherein the first speaker and the second speaker further comprise a fourth hinge disposed between the FL speaker and the RL speaker and a fifth hinge disposed between the FR speaker and the RR speaker, respectively, and wherein the first hinge is disposed between one of the media playback unit and the FL speaker; and the auxiliary block and the RL speaker, and the second hinge is disposed between one of the media playback unit and the FR speaker; and the auxiliary block and the RR speaker.

7. The apparatus in accordance with claim 6, wherein the first hinge is disposed at one of a lower portion of a boundary between the FL speaker and the media playback unit; and a lower portion of a boundary between the RL speaker and the auxiliary block, and the second hinge is disposed at one of a lower portion of a boundary between the FR speaker and the media playback unit; and a lower portion of a boundary between the RR speaker and the auxiliary block when the fourth hinge and the fifth hinge are disposed at an upper portion of the FL speaker and the RL speaker; and an upper portion of the FR speaker and the RR speaker, respectively, and wherein the first hinge is disposed at one of an upper portion of the boundary between the FL speaker and the media playback unit; and an upper portion of the boundary between the RL speaker and the auxiliary block, and the second hinge is disposed at one of an upper portion of the boundary between the FR speaker and the media playback unit; and an upper portion of the boundary between the RR speaker and the auxiliary block when the fourth hinge and the fifth hinge are disposed at a lower portion of the FL speaker and the RL speaker; and a lower portion of the FR speaker and the RR speaker, respectively.

8. The apparatus in accordance with claim 1, further comprising a fixing means disposed at an interface between the media playback unit and the first speaker and the second speaker.

9. The apparatus in accordance with claim 8, wherein the fixing means comprises one of a magnet and a snap-on button.

10. The apparatus in accordance with claim 1, further comprising a flexible connecting means for electrically connecting the media playback unit, and the first speaker and the second speaker.

11. The apparatus in accordance with claim 10, wherein the flexible connecting means comprises one of a flexible PCB and a flexible flat cable.

12. The apparatus in accordance with claim 1, wherein the first speaker and the second speaker is disposed in a manner that the audible signal is emitted in an outward direction.

13. The apparatus in accordance with claim 1, wherein the media playback unit further comprises a case for accommodating the detachable media player.

14. The apparatus in accordance with claim 1, wherein the media playback unit comprises a communication interface for carrying out a data communication with an external storage means, the media playback unit reading through the communication interface and reproducing the media file stored in the external storage means.

15. The apparatus in accordance with claim 1, further comprising a speaker controller for controlling an operation of the FL speaker and the RL speaker, and the FR speaker and the RR speaker.

* * * * *